Dec. 17, 1963 S. I. MacDUFF Re. 25,494

COMBINATION SPOOL VALVES

Original Filed Sept. 11, 1957 2 Sheets-Sheet 1

INVENTOR.
STANLEY I. MAC DUFF.
BY
William P. Hickey
ATTORNEY.

COMBINATION SPOOL VALVES

Original Filed Sept. 11, 1957 2 Sheets-Sheet 2

INVENTOR.
STANLEY I. MAC DUFF
BY
William P. Hickey
ATTORNEY.

United States Patent Office

Re. 25,494
Reissued Dec. 17, 1963

25,494

COMBINATION SPOOL VALVES

Stanley I. MacDuff, St. Joseph, Mich., assignor to The Bendix Corporation, a corporation of Delaware Original No. 2,998,025, dated Aug. 29, 1961, Ser. No. 683,423, Sept. 11, 1957. Application for reissue Aug. 27, 1963, Ser. No. 305,246
19 Claims. (Cl. 137—636.3)

Matter enclosed in heavy brackets [ ] appears in the original patent but forms no part of this reissue specification; matter printed in italics indicates the additions made by reissue.

The present invention relates to control valves of the type adapted to supply a modulated pressure to one or the other of two outlet ports; and more particularly to a hydraulic control valve of the above referred to type.

*One of the objects of this invention is to provide a control valve capable of controlling delivery of fluid to several working ports with the pressure of the fluid delivered to one port widely varying from and being independent of the pressure of the fluid delivered to the other port.*

[An] *Another* object of the present invention is the provision of a new and improved control valve formed by a chamber of uniform cross section having a feed port, a control port, and an exhaust port, spaced in that order, and a valve spool therein having first and second land portions—the first of which overlies a portion of the chamber's sidewalls between the feed and control ports, while the second land portion overlies a portion of the sidewalls between the control and exhaust ports, and wherein movement of the spool axially of the chamber varies the relative leakage rates from the feed to the control port and from the control to the exhaust port to smoothly regulate the control pressure in the control port.

Another object of the present invention is the provision of a new and improved control valve having a first portion for modulating a control pressure intermediate inlet and exhaust pressures, and a second portion for diverting this pressure to one or the other of a pair of outlet ports thereby modulating the pressure in either one of the outlet ports.

Another object of the present invention is the provision of a new and improved control valve of the immediately above referred to type having a controlled member with two degrees of movement—one degree of which is used to actuate the first referred to valve portion and the second degree of movement of which is used to actuate the second valve portion to smoothly deliver a modulated pressure to either one of a pair of outlet ports.

Another object of the present invention is the provision of a new and improved hydraulic control valve having a first portion for producing a modulated pressure and a second portion for conducting the modulated pressure to either one or both of a pair of outlet ports—the second valve portion being adapted to close off one of the outlet ports when its movable member is moved out of its center position by a predetermined amount, and also being adapted upon continued movement in the same direction to dump all pressure from the previously valved off outlet port, whereby modulated control of the systems connected to the outlet ports can be achieved by an intermediate degree of control movement and pressure in either of the systems controlled can be quickly dumped by extreme movements of the control member.

The invention resides in certain constructions and combinations and arrangements of parts, and further objects and advantages will become apparent to those skilled in the art to which the invention relates from the following description of the preferred embodiment described with reference to the accompanying drawings, and in which.

Figure 1:
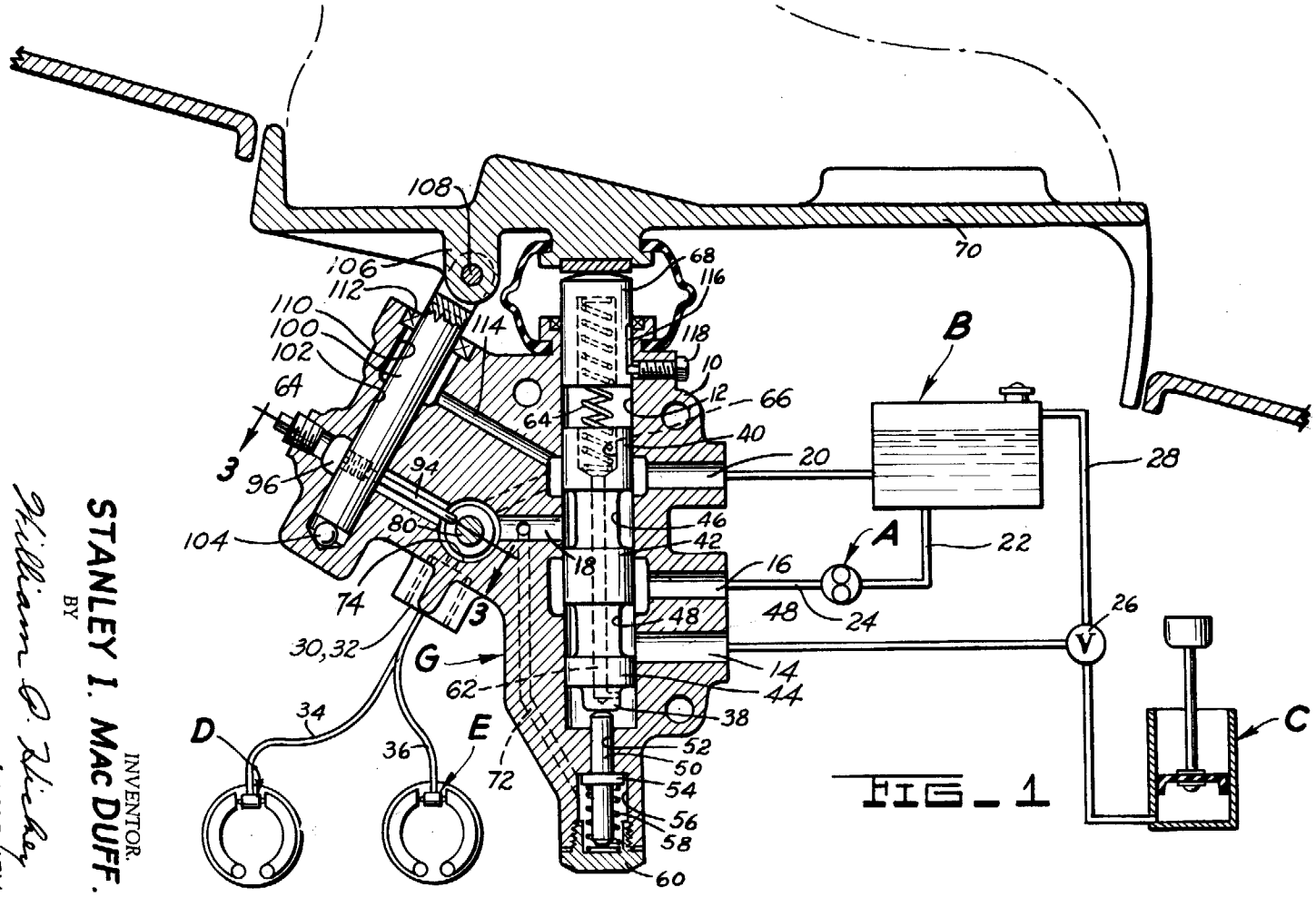
FIGURE 1 is a cross-sectional view of a valve embodying the principles of the present invention and which view also schematically depicts the hydraulic system in which the valve is intended to be used.
Figure 2:
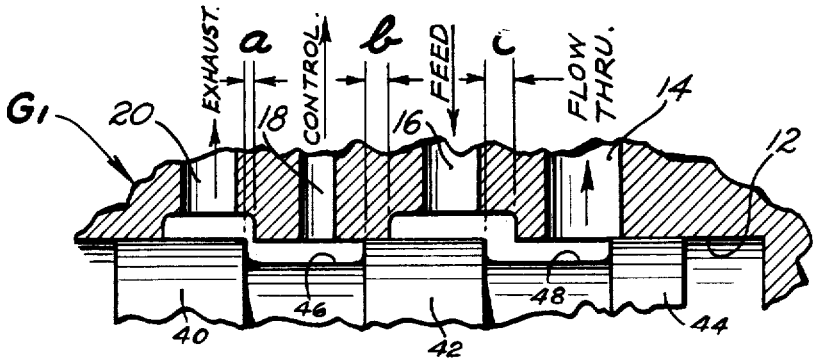
FIGURE 2 is a fragmentary cross-sectioanl view of certain porting in the valve.
Figure 3:
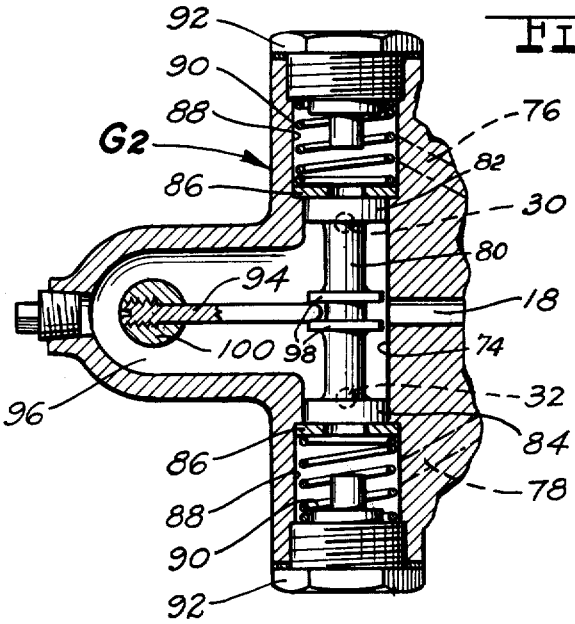
FIGURE 3 is a fragmentary cross-sectional view taken approximately on the line 3—3 of FIGURE 1.

The hydraulic system shown in FIGURE 1 of the drawings is adapted to perform the combined functions of operating a hydraulic lift on a farm tractor, as well as to operate the two rear wheel brakes of the vehicle. The system shown is of the "open center type" wherein fluid discharged from hydraulic pump A is continually circulated through the system back to the reservoir B without producing any appreciable back pressure against the hydraulic pump A, until such time as either the hydraulic lift C, or either one or both of the brake applying wheel cylinders D and E are actuated by the operator. Related systems are shown in the S. I. MacDuff Patent 2,517,005 and the J. B. Brown Patent 2,624,361; and the major advantage of such systems is that instantaneous control is always available without wasting appreciable amounts of energy except during those times when the control devices are actually actuated. Peculiar problems are involved in the control of the system shown in the drawing, however, inasmuch as each of the brake applying wheel cylinders D and E must be smoothly supplied with modulated pressure to actuate either of the wheel cylinders individually or simultaneously.

The control valve G shown in the drawing for controlling the operation of the wheel cylinders D and E comprises a body member 10 having a generally vertically extending cylindrical bore 12 therein, provided with a flow-through port 14, a feed port 16, a control port 18 and an exhaust port 20, spaced apart vertically in that order. Fluid from the reservoir B is supplied to the pump A by conduit 22, and the discharge of pump A is supplied to the feed port 16 through the conduit 24. In the normal condition of the valve, wherein neither of the wheel cylinders D or E are being actuated, flow from the pump A is communicated directly from the feed port 16 to the flow-through port 14; and is thence conducted through an open center control valve 26 to its exhaust line 28 by which the flow is returned to reservoir B. The fluid discharged from the pump A circulates continually through this system at a pressure just sufficient to overcome line friction until such time as either the control valve 26 or the control valve G is actuated, whereupon a suitable back pressure is created by either of these control valves, 26 or G, against the pump A to actuate the control device. The control valve 26 may be of any well known commercial construction; it forms no part of the present invention; and will not be elaborated upon. It will be seen, that during the normal condition of the hydraulic system, substantially no pressure will exist in the feed port 16; and that a variable pressure will be experienced in the feed port 16 during actuation of the hydraulic lift C depending upon the back pressure developed by its control valve 26. It is a function of the portion G1 of the control valve comprising the valve ports previously recited to deliver various degrees of pressure from the feed port 16 to the control port 14 when back pressure from the control valve 26 is experienced; and to, at the same time, provide means for developing a suitable back pressure in the feed port 16 whenever the control valve 26 is not being actuated. Fluid pressure delivered to the control port 16 is thereafter controlled by a second portion G2 of the valve, which portion, either simultaneously or individually, delivers the control pressure to one or the other of two outlet ports 30 and 32 which respectively communicate with the wheel cylinders D and E through lines 34 and 36 respectively.

The pressure modulating portion G1 of the valve is completed by a movable valve member or slide 38 positioned in the vertically extending cylindrical bore 12 and adapted to control communication between its various valve ports. The movable valve member 38 is formed from a generally cylindrical structure having a generally predetermined fit with respect to the sidewalls of the cylinder bore 12, and is provided with three vertically spaced land portions 40, 42, and 44, formed by recesses 46 and 48, the first of which must have a generally predetermined width with respect to the distances between the feed and exhaust ports 16 and 18 as will now be described.

In the normal position of the movable valve member 38, the bottom edge of the first land portion 40 will be held open from the bottom edge of the exhaust port 20 a generally predetermined distance "a" by a plunger 50 extending through an opening 52 in the bottom end of the bore 12 to abut the lower end of the movable valve member 38. Plunger 50 is provided with a shoulder 54 which engages the upper end of a counter bore 56 which acts as a stop for the shoulder 54, and the plunger is held in its upper position against the upper end of the counter bore by a coil spring 58 positioned between the flange 54 and an end cap 60 screwed into the lower end of the counter bore 56. The first recess 46 has a width which is less than the width of *the* cylinder sidewall separating the feed and exhaust ports 16 and 20 by an amount, which will provide an amount of overlap "b" with respect to the feed port 16, which is greater than the underlap distance "a" previously recited by a predetermined amount. The width of the second land portion 42 is made less than the width of the feed port 16 by an amount which will provide an underlap clearance "c" between the lower end of the second land portion 42 and the lower end edge of the feed port 16 by an amount greater than the overlap "b." In the normal position of the movable valve member 38 just recited, discharge from the pump A will therefore be able to proceed with substantially no restriction from the feed port 16 through the clearance "c" provided between the lower edge of the second land portion 42 and the bottom edge of the feed port 16 to the flow-through port 14, thence back to the reservoir B without producing any substantial back pressure in the feed port 16. The third land portion 44 on the bottom end of the movable member 38 is used principally to close off the lower end of the cylinder bore 12 from the flow-through port 14, and a longitudinal drilling 62 is provided in the movable valve member 38 to communicate equal pressures to its opposite ends, and thereby help produce a balancing effect across the movable member 38. *Pressure in the recess 46 is conducted by means of a drilled passageway 72 in the body member to the lower end of the plunger 50 to cause the plunger to oppose downward movement of the control member 38.*

Actuating movement of the movable valve member 38 is accomplished through a graduation spring 64, the lower end of which is seated in a counter bore 66 in the upper end of the valve member 38, and the upper end of which spring is seated in a cup-shaped plunger 68 mounted in the upper end of the cylinder bore 12. The lower end of the cup-shaped plunger 68 is spaced above the movable valve member 38 a sufficient distance to provide graduating movement of the spring 64, and the top end of the cup-shaped plunger 68 projects out of the body member 10 a sufficient distance to permit its actuation by means of a tiltable foot pedal structure 70 adapted to abut the top edge of the plunger. Downward movement of the tiltable foot pedal structure 70 is therefore transmitted through the graduation spring 64 to the movable valve member 38 forcing the plunger 50 downwardly into its counterbore 56. Initial downward movement of the movable valve member 38 when moved a distance "a" causes the first land portion 40 to close off the exhaust port 20, and thereafter produce a condition wherein both the first and second land portions 40 and 42 each overlap a portion of the sidewalls of the cylinder 12 intermediate the feed port 16 and the exhaust port 20. *In this position, which is a transitory position, it* [It] is a desired object of the present invention to provide controlled leakage between the feed port 16 and the exhaust port *20* [18] by means of a predetermined clearance between the movable valve member 38 and its cylinder walls; such that a pressure will be created within the first recess 46 which will produce a leakage rate out past the first land portion 40 to the exhaust port 20, which just equals the rate of leakage into the first recess 46 past the second land portion 42. It [would] *will* be seen, therefore, that downward movement of the control member 38, after the time that the first land portion closes off the exhaust port 20, will cause a gradually increasing resistance to flow out of the recess 46, while at the same time decreasing the resistance to leakage into the recess 46 from the feed port 16 until such time as the movable valve member has been moved the distance "b" and the top edge of the second valve land portion 42 begins to open the feed portion 16. *Therefore, upward movement of the movable valve member 38, while the recess 46 is cut-off from the exhaust port and the feed port, will reduce the pressure in the recess 46 and the control port 18 and downward movement of the movable valve member 38 will increase the pressure in the recess 46 and the control port 18.* By *suitably* [suitable] designing the clearance between the movable valve member 38 and the side walls of the cylinder, with respect to the inlet pressures to the valve, the general range of modulated pressure desired, and the amount of valve travel desired, laminar flow can be assured in the leakage paths into and out of the recess 46. [It will thus be seen that smooth and sensitive control will therefore always be achieved when the pressure in the control port 18 approaches its "set point," by properly controlling the amount of clearance provided between the movable valve member 38 and the side walls of the cylinder bore 12.]

*If the hydraulic lift C is being actuated at the time the foot pedal structure 70 is actuated, and if the pressure required at the control port 18 is less than the back pressure effected by closing the valve 26, then the upper edge of land 42 will restrict flow from the feed port 16 to the recess 46 while the lower edge of land 42 maintains unrestricted flow from the feed port 16 to the flow-through port 14. When the pressure in the control port 18 approaches the "set point" corresponding to a foot pedal actuating position, the pressure conducted to the lower end of plunger 50 will act thereon to move the movable valve member 38 upwardly against the spring 64 to close off the recess 46 from the feed port 16 at which point the pressure in the recess 46 and the control chamber 18 will remain at a level determined by the position of the pedal 70. Due to the leakage characteristics described above, there will be smooth and sensitive control when the recess 46 is communicated to the feed port 16 and and when the pressure in the control port 18 approaches its "set point."*

[The above stated valve movement produces pressure within the control port 18 provided back pressure existed in the feed port 16 as a result of back pressure produced by the control valve 16.] If the hydraulic lift C [was] *is* not being actuated at the time the foot pedal 70 [was] *is* being actuated, no pressure rise [would] *will* be experienced within the first recess 46 until such time as the lower edge of the second land portion 42 is brought into the proximity of the lower edge of the feed port 16. The second land portion 42 is preferably provided with a width less than that of the feed port 16 by an amount which causes the upper end of the second land portion 42 to have been moved clear from the upper edge of the feed port 16 at the time that appreciable back pressure is developed within the feed port 16 by the approaching of the lower end of the second land portion 42 with operate both portions of the valve, such that the tilting motion provides the desired controlled output pressure, while the swinging action of the operator's foot distributes this pressure to either one of the brake applying wheel cylinders D and E. The centering structure provided on either end of the spool valve 80 will normally hold the foot pedal structure 70 in its centered position, and in this position a tilting action of the pedal structure 70 will simultaneously deliver the control pressure to both wheel cylinders D and E to apply the same with equal intensity.

As a further refinement in the structure forming the second portion G2 of the valve, the land portion 82 and 84 of the valve are made sufficiently thin such that continued rotation of the shaft 100 after the position in which the outlet ports are valved off from the controlled pressure port 18, will cause the opposite edge of the lands 82 and 84 to move past the outlet ports and open communication between the appropriate outlet port and the adjacent exhaust port 76 or 78. The pressure within the now opened outlet port 30 or 32 as the case may be, will therefore be immediately dumped.

In order to complete the description of the structure shown in the drawing, the upper end of the bore 102 is slightly counter bored as at 110 to relieve leakage between the shaft 100 and its bore 102. The upper end of the counter bore 110 is provided with a suitable seal 112, and the counter bore 110 is communicated with the exhaust port 20 by the passageway 114. In order that the cup-shaped plunger 68 will be retained within the upper end of the bore 12, a longitudinally extending groove 116 is milled into the outer edge of the cup-shaped plunger 68, and the inner end of a set screw 118 is positioned in the groove to limit the extent of the plungers vertical movement.

While the preferred embodiment of the invention has been described in considerable detail, I do not wish to be limited to the particular constructions shown and described, and it is my intention to cover hereby all novel adaptations, modifications, and arrangements thereof, which come within the practice of those skilled in the art to which the invention relates as covered by the following claims.

I claim:

1. In a control valve: a body member having a generally cylindrical chamber therein, a slide valve mounted for reciprocatory movement in said cylindrical chamber, said slide valve and chamber having spaced complementary land-and-groove portions of said chamber-and-valve defining therebetween an exhaust port means, a feed port means and flow-through port means, said spaced complementary land-and-groove portions being proportioned to effect sequentially upon relative movement between said slide valve and chamber a closing of said exhaust port means, restriction of communication between said feed port means and flow-through port means to effect modulation of pressure [provided from] *at* said feed port means and thereafter separation of said flow-through port means from said feed port means [to develop back pressure from said feed port means], and control port means disposed between said exhaust port means and feed port means and having fluid connections with said exhaust port means in the normal position of said slide valve in said chamber and with said feed port means at operating positions of said slide valve in said chamber to receive said modulated pressure [or back pressure] from said feed port means.

2. The control valve structure in accordance with claim 1 including a movable wall disposed at the end of said slide valve toward which the valve is moved to its operating positions and means to effect biasing effort on said valve for urging said valve to its normal position for communicating pressure from said control port means to said wall to balance input effort biasing said slide valve to one of its operating positions.

3. In a control valve: a body member having a generally cylindrical chamber therein whose sidewalls have an exhaust port, a controlled pressure port, a feed port, and a flow-through port; a slide valve in said chamber constructed and arranged for reciprocatory movement relative to said ports; said slide having first and second land portions having a generally predetermined fit with respect to said sidewalls, said land portions being separated by a recess to form a terminating side edge for the first land portion and a beginning side edge of the second land portion, said second land portion also having a terminating side edge on its opposite end; [said recess having a width which is less than the distance between said exhaust and feed ports by a first generally predetermined amount, and said second land having a width which is less than the width of said feed port by a second generally predetermined amount which is less than said first generally predetermined amount,] said slide having a normal position wherein the terminating side edge of said first land portion is positioned open with respect to the edge of said exhaust port by a first generally predetermined distance, said beginning side edge of said second land portion is spaced from said feed port by a second generally predetermined distance, and the terminating side edge of said second land portion is spaced open with respect to said feed port by a third generally predetermined distance, said third distance being greater than said second distance which in turn is greater than said first distance, whereby movement of said slide in the direction of said flow-through port sequentially closes off said exhaust port to pressurize said controlled pressure port, thereafter modulates the pressure in said control port if pressure is available in said feed port, and thereafter *restricts communication between* [separates] said flow-through port [from] *and* said feed port to develop back pressure in said feed port [if none previously existed.]

4. In a control valve: a body member having a generally cylindrical chamber therein whose sidewalls have an exhaust port, a controlled pressure port, a feed port, and a flow-through port positioned in that order between upper and lower ends of said chamber, a slide valve in said chamber constructed and arranged for reciprocatory movement relative to said ports; said slide having upper and lower land portions having a generally predetermined fit with respect to said sidewalls, said land portions being separated by a recess to form a terminating side edge for the upper land portion and a beginning side edge of the lower land portion, said lower land portion also having a terminating side edge on its opposite end; [said recess having a width which is less than the distance between said exhaust and feed ports by a first generally predetermined amount, and said second land having a width which is less than the width of said feed port by a second generally predetermined amount which is less than said first generally predetermined amount,] said slide having a normal position wherein the terminating side edge of said upper land portion is positioned open with respect to the edge of said exhaust port by a first generally predetermined distance, said beginning side edge of said lower land portion is spaced upwardly of the upper side edge of said feed port by a second generally predetermined distance, and the terminating side edge of said lower land portion is spaced open with respect to the lower side edge of said feed port by a third generally predetermined distance, said third distance being greater than said second distance which in turn is greater than said first distance, whereby downward movement of said slide sequentially closes off said exhaust port to pressurize said controlled pressure port, thereafter modulates the pressure in said control port if pressure is available in said feed port, and thereafter [separates] *restricts communication between* said flow-through port [from] *and* said feed port to develop back pressure in said feed port [if none previously existed], and expansible means positioned against the lower end of said slide valve and supplied with the lower end of the feed port 16. [Inasmuch as suitable clearance is provided between the movable valve member 38 and its cylinder bore 12 to provide predetermined leakage therepast, no sudden rise in pressure in the feed port 16 is experienced when the lower end of the second land portion 42 moves into registry with the portion of the cylinder walls between the feed port 16 and the flow-through port 14. Thereafter, further downward movement of the movable valve member 38 gradually increases the flow restriction between the feed port 16 and the flow-through port 14 to produce a gradually modulated pressure within the feed port 16. Inasmuch as the lower edge of the first land portion 40 is still a considerable distance from the upper edge of the control port 18, continued downward movement of the movable valve member 38 will now adjust the leakage paths between the feed port 16 and the flow-through port 14 while at the same time adjusting the leakage path from the feed port 16 to the exhaust port 20.] *The lower edge of the land 42 restricts flow to the flow-through port 14 and the upper edge of the land 42 will communicate unrestricted flow to the recess 46 and the control port 18 until the pressure acting on the plunger 50 moves the valve member 38 upwards to regulate the flow between the feed port 16 and the control port 18 and flow-through port 14 to maintain a pressure at the control port 18 determined by the position of the brake pedal 70.* Suitable modulated pressure within the recess 46 will therefore still be provided, even though back pressure is not being produced by the control valve 26.

*It should also be noted that if the braking pressure required is greater than the back pressure at the feed port effected by closing valve 26 during operation of lift C, then the foot pedal 70 will be depressed to the point wherein the lower edge of the land 42 restricts flow to the flow-through port 14 to effect higher back pressure in the feed port and the upper edge of the land 42 will communicate unrestricted flow to the control port 18 until the pressure acting on plunger 50 moves the valve member 38 upwards to regulate the flow between the feed port and the recess 46 and flow-through port 14 to maintain a pressure at the control port 18 determined by the position of the brake pedal 70.*

*If the foot pedal 70 is depressed for a "panic" stop, then for a split second, the lower edge of the land 42 will cut-off communication between the feed port 16 and the flow-through port 14 and as pressure builds up in the recess 46 and control port 18, pressure communicated to the plunger 50 will act on the movable valve member 38 to move the same upwards to a position determined by the position of the pedal 70 and the relationship between the braking pressure required and the pressure at the flow-through port mentioned above. Cutting off of the flow-through port from the feed port will occur under a "panic" brake effort if the valve 26 is not actuated, or if the back pressure created by actuating valve 26 is below or even in most instances, if the back pressure is above that required by the brake for a "panic" stop.*

*It should be realized that if pressure is required by the lift C while a "panic" stop is made, the cutting-off of communication between the feed port and flow-through port will be practically speaking, unnoticeable since the cut-off period will be for a fraction of a second and the valving operation will be smooth.*

[In order to provide a reaction against the foot of the operator which] *The pressure communicated from the control port 18 to the bottom of the plunger 50 acts on the plunger 50 providing a reaction against the foot of the operator. This reaction* will apprise the operator of the amount of control pressure being developed by the valve, and [which] will aid him in the proper positioning of the movable valve member 38 [,]. [pressure from the control port 18 is conducted to the bottom end of the plunger 50 by means of a drilled passageway 72 in the body member to cause this plunger 50 to oppose the downward movement of the control member 38.] This reaction will, of course, be generally proportional to the pressure developed in the control port 18 and can be made to be of any desired maximum intensity by properly sizing the diameter of the plunger. *In all instances, a partial release of pressure on the foot pedal 70 will result in* [Upward] *upward* movement of the movable valve member 38 *which* will, of course, reduce the pressure in the control port 18, both during the time[s] that pressure is, and during the time that pressure is not created by the control valve 26; and a complete release of pressure against the foot pedal structure 70 will permit the coil spring 58 to move the lower edge of the first land portion 40 clear of the exhaust port 20 to completely remove pressure from the brake applying wheel cylinders D and E.

As previously indicated pressure from the control port 18 is communicated to the outlet ports 30 and 32 by means of the second valve portion G2. The second valve portion G2 comprises a cylindrical chamber 74 into which the control port 18 communicates. The output ports 30 and 32 are positioned on opposite sides of control port 18 by a suitable distance, and a pair of exhaust ports 76 and 78 are positioned one on either end of the outlet ports 30 and 32. A spool valve 80 having opposite end land portions 82 and 84 is positioned within the cylindrical chamber 74 for controlling flow in and out of outlet ports 30 and 32. The land portions 82 and 84 of the spool number 80 are spaced apart a distance slightly greater than the distance between the outlet ports 30 and 32 such that the control port 18 will be communicated with both of the outlet ports 30 and 32 when the spool valve 80 is centered within the cylindrical chamber 74. Spool 80 is biased into its center position by means of a pair of identical opposing structures on either end of the spool, which include washers 86 seated against the bottom ends of counterbores 88 in opposite ends of the cylinder chamber 74, and which washers are biased inwardly towards their respective ends of the spool by means of coil springs 90 which are compressed and held into position by means of closure members 92 screwed into the outer ends of the counter bores.

Communication of the control port 18 with either of the outlet ports 30 or 32 can be prevented by suitable shifting the spool valve 80 endwise of its cylinder 74 until the cooperating land portion of the spool completely overlies the outlet port. The structure shown in the drawing for shifting the spool valve 80 comprises a lever arm 94 positioned in a suitable recess 96 in the body member 10, and one end of which is confined within a pair of flanges 98 on the spool member 80 while the other end is adapted to be rotated by shaft 100. Rotation of the shaft 100, therefore, causes the lever arm 94 to move the slide 80 endwise of its cylinder causing its land portions to close off the appropriate one of the outlet ports. The shaft 100 is journaled in a generally vertically extending drilling in the body member 10 and is pivotally supported at its lower end by a ball 104 positioned between the bottom end of the bore 102 and the lower end of the shaft 100.

The upper end of the shaft 100 extends between a pair of downwardly extending projections 106 on the bottom of the foot pedal lever structure 70, and is tiltably connected thereto by means of a pin 108 extending through the projections and through the top end of the shaft 100. It will, therefore, be seen that the foot pedal structure 70 is suitably supported for two degrees of movement—the first of which is a tilting movement which does not move the shaft 100 but actuates the first portion G1 of the valve, and the second degree of which provides a swinging action over the top of the cup-shaped plunger 63 which turns the shaft 100 to actuate the second portion G2 of the valve. It will therefore be seen that the foot pedal structure 70 can be used to simultaneously pressure from said control port to aid in the positioning of said slide valve.

5. In a control valve constructed in accordance with claim 4 an outlet valve formed by a cylindrical outlet valve chamber in said body member, said controlled pressure port opening into said outlet valve chamber, said body member also having first and second outlet ports in said outlet chamber positioned on opposite sides of said controlled pressure port, an outlet valve spool in said outlet chamber having first [or] *and* second lands spaced apart a distance greater than the distance between said outlet ports, and means for moving said spool to close off one or the other of said outlet ports while adjusting said slide valve to control the pressure in said outlet ports.

6. In a control valve constructed in accordance with claim 4 an outlet valve formed by a cylindrical outlet valve chamber in said body member at substantially right angle to said first mentioned chamber, said controlled pressure port opening into said outlet valve chamber, said body member also having first and second outlet ports in said outlet chamber positioned on opposite sides of said controlled pressure port, an outlet valve spool in said outlet chamber having first [or] *and* second lands spaced apart a distance greater than the distance between said outlet ports.

7. In a control valve: a body member having a longitudinal chamber of generally uniform cross-section, said chamber having a pressure port, a controlled pressure port, and an exhaust port arranged in that order in the sidewalls thereof; a slide valve in said longitudinal chamber constructed and arranged for reciprocatory movement relative to said ports, said slide valve having first and second land portions having a generally predetermined fit with respect to said sidewalls; said slide being so constructed and arranged that said first land portion overlies at least a portion of said sidewalls between said exhaust and controlled pressure ports, when said second land portion overlies at least a portion of said sidewalls between said controlled pressure port and said pressure port; said first and second land portions having sufficient axial length so that axial movement in one direction increases the amount of sidewall area between said pressure and controlled pressure ports lapped by said second land portion while at the same time decreasing the amount of sidewall between said controlled pressure and exhaust ports that is lapped by said first land portion; an outlet valve chamber in said body, said controlled pressure port opening into said outlet valve chamber; said body member also having first and second outlet ports in said outlet chamber positioned on opposite sides of said controlled pressure port; an outlet valve spool in said outlet chamber having first and second lands spaced apart a distance greater than the distance between said outlet ports; and means for moving said spool to close off one or the other of said outlet ports, whereby the variable leakage rates provided by said slide valve assures smooth application of control pressure to either of said outlet ports during actuation of said spool valve, a shaft extending generally parallel with respect to said slide valve, an arm connected to said shaft for transferring rotary movement of said shaft to said outlet valve spool and a pedal member non-rotatably connected to said shaft for turning said shaft, said pedal member also being tiltable relative to said shaft for producing movement of said slide valve longitudinally of its chamber, whereby the amount of pressure developed by said valve is determined by the tilting of said pedal member and the outlet port to which it is directed is controlled by turning of the pedal member.

8. In a control valve for modulating a pressure to one or both of a pair of outlet ports: a body member having a first valve chamber which communicates a pressure inlet port, an exhaust port, and a control port, said body member having a second valve chamber extending generally at right angles to said first valve chamber, said second valve chamber having a pair of outlet ports, and an inlet port communicating with said control port of said first valve chamber; first valve means for controlling communication between said control, and said exhaust and inlet ports to control the pressure in said control port; second valve means for communicating said control pressure port to one or both of said outlet ports for supplying one or the other of said outlet ports with modulated pressures intermediate that in said pressure and exhaust ports; a shaft rotatably mounted generally parallel to said first valve chamber, a treadle pinned generally transversely to said shaft, means actuating said second valve means by rotation of said shaft, and means actuating said first valve means by tilting movement of said treadle about said pinned connection between said treadle and shaft; whereby modulated pressures intermediate that in said pressure and exhaust ports can be supplied to one or the other of said outlet ports by appropriate movement of said treadle.

*9. In a control valve assembly having a feed port means, flow-through port means, control port means, and exhaust port means: a pair of relatively movable valve members, one of said valve members forming a chamber therein, the other of said valve members being mounted for relative reciprocatory movement in said chamber, the wall of said chamber and said other valve member being constructed to define therebetween passage means communicating said feed port means with said flow-through port means, communicating said feed port means with said control port means, and communicating said control port means with said exhaust port means, said members being arranged that: in normal position relative to each other said exhaust port means is communicated to said control port means and said feed port means is communicated to said flow-through port means and cut-off from said control port means; said valve members effect in sequence, upon relative movement of said members from said normal position, cutting-off said control port means from said exhaust port means and maintaining said control port means cut-off from said feed port means while maintaining communication of said feed port means with said flow-through port means and then communicating said control port means with said feed port means while maintaining said control port means cut-off from said exhaust port means and communication of said feed port means with said flow-through port means.*

*10. In a control valve assembly having feed port means, flow-through port means, control port means, and exhaust port means: a pair of relatively movable valve members, one of said valve members forming a chamber therein, the other of said valve members being mounted for relative reciprocatory movement in said chamber, the wall of said chamber and said other valve member being constructed to define therebetwen passage means communicating said feed port means with said flow-through port means, communicating said feed port means with said control port means, and communicating said control port means with said exhaust port means, said members being arranged that: in normal position relative to each other said exhaust port means is communicated to said control port means, said feed port means is communicated to said flow-through port means and cut-off from said control port means; said valve members effect in sequence upon relative movement of said members from said normal position cutting-off said control port means from said exhaust port means and maintaining said control port means cut-off from said feed port means while communicating said feed port means with said flow-through port means, then communicating said control port means with said feed port means while maintaining said control port means cut-off from said exhaust port means and communicating said feed port means with said flow-through port means, and then cutting-off said control port means from said feed port means while maintaining said control*

*port means cut-off from said exhaust port means and communication betwen said feed port means and said flow-through port means to maintain pressure at said control port means when the pressure required at said control port means is less than that at said flow-through port means and is attained.*

*11. In a control valve assembly as recited in claim 9 wherein said wall of said chamber and said other valve member have complementary lands-and-grooves defining said passage means.*

*12. In a control valve assembly as recited in claim 9 wherein the fluid pressure at said control port means acts on said other valve member to provide "reaction" for one operating said valve assembly.*

*13. In a control valve assembly having feed port means, flow-through port means, control port means, and exhaust port means: a pair of relatively movable valve members, one of said valve members forming a chamber therein, the other of said valve members being mounted for relative reciprocatory movement in said chamber, the wall of said chamber and said other valve member being constructed to define therebetween passage means communicating said feed port means with said flow-through port means, communicating said feed port means with said control port means, and communicating said control port means with said exhaust port means, said members being arranged that: in normal position relative to each other said exhaust port means is communicated to said control port means and said feed port means is communicated to said flow-through port means and cut-off from said control port means; when said valve members are in a transistory position relative to each other, communication of said control port means with said feed and exhaust port means will be cut-off and said feed port means will be communicated with said flow-through port means; in one operating position relative to each other said control port means will be cut-off from said exhaust port means and restricted flow will be communicated from said feed port means to said control port means and unrestricted flow will be communicated from said feed port means to said flow-through port means when the pressure at said flow-through port means is greater than that required at said control port means; in a second operating position relative to each other, said control port means will be cut-off from said exhaust port means and unrestricted flow will be communicated to said control port means from said feed port means and restricted flow will be communicated to said flow-through port means from said feed port means when the pressure required at said control port means is greater than that at said flow-through port means; and in a third operating position relative to each other, which is the same as said transistory position, pressure is maintained at said control port means; said third operating position occurring only when the pressure at said flow-through port means is greater than the pressure required at said control port means and when the pressure required at said control port means is reached; and means for effecting relative movement betwen said valve members.*

*14. In a control valve assembly: a pair of relatively movable valve members, one of said valve members forming a chamber therein, the other of said valve members being mounted for relative reciprocatory movement in said chamber, the wall of said chamber and said other valve member having spaced complementary land-and-groove portions defining therebetween exhaust port means, feed port means, control port means, and flow-through port means, said control port means being cut off from said feed port means and having fluid connections with said exhaust port means in relative normal position of said valve members, said spaced complementary land-and-groove portions being proportioned to effect sequentially upon relative movement between said valve members cutting-off said control port means from said exhaust port means, communication between said feed port means and said control port means and restriction of communication between said feed port means and flow-through port means to effect modulation of pressure at said feed port means in order for said control port means to receive said modulated pressure from said feed port means.*

*15. In a control valve assembly as recited in claim 10 wherein said control port means is located between said exhaust port means and said feed port means.*

*16. In a control valve assembly: a pair of relatively movable valve members, one of said valve members forming a chamber therein, the other of said valve members being mounted for relative reciprocatory movement in said cylindrical chamber, the wall of said chamber and said other valve member having spaced complementary land-and-groove portions defining therebetween and exhaust port means, feed port means, control port means, and flow-through port means, said spaced complementary land-and-groove portions being proportioned to effect sequentially upon relative movement between said valve members a closing of said exhaust port means, restriction of communication between said feed port means and flow-through port means to effect modulation of pressure at said feed port means and thereafter separation of said flow-through port means from said feed port means, said control port means having fluid connections with said exhaust port means in relative normal position of said valve members and with said feed port means at relative operating positions of said valve members to receive said modulated pressure from said feed port means.*

*17. In a control valve assembly as recited in claim 16 wherein said control port means is located between said exhaust port means and feed port means.*

*18. In a control valve assembly having a fluid pressure feed port, an exhaust port, and a flow-through port, a pair of relatively movable valve members, one of said valve members forming a generally cylindrical chamber therein, the other of said valve members being mounted for relative reciprocatory movement in said chamber, said other valve member having at least a pair of axially spaced lands, the wall of said chamber having a pair of axially spaced port means arranged to coact with said lands, one of said lands separating said chamber into two axially spaced inner chambers with one of said inner chambers being located between said pair of lands, first passage means communicating one of said port means to said exhaust port, second passage means communicating the other of said port means to said feed port, third passage means for communicating said flow-through port with the other of said inner chambers, control port means located between said lands and in communication with said one inner chamber, said lands being so constructed with relation to said port means that: when said other valve member is in normal position relative to said port means, said one land will communicate said feed port to said flow-through port via said other inner chamber and cut-off communication of said one inner chamber and said control port means from said feed port and the other of said lands will communicate said control port means to said exhaust port via said one inner chamber; when said other valve member is in a transitory position, between said normal position and an operating position, relative to said port means, said lands will cut-off communication of said one inner chamber and said control port means from said feed and exhaust ports while said one land communicates said flow-through port via said other inner chamber with said feed port; and when said other valve member is in said operating position relative to said port means, said other land will cut-off said one inner chamber and said control port means from said exhaust port and said one land will communicate said control port means to said feed port via said one inner chamber and communicate said flow-through port to said feed port via said other inner chamber; and means for effecting relative movement between said members.*

*19. In a control valve assembly having a fluid pressure*

*feed port, an exhaust port, and a flow-through port, a pair of relatively movable valve members, one of said valve members forming a generally cylindrical chamber therein, the other of said valve members being mounted for relative reciprocatory movement in said chamber, said other valve member having at least a pair of axially spaced lands, the wall of said chamber having a pair of axially spaced port means arranged to coact with said lands, one of said lands separating said chamber into two axially spaced inner chambers with one of said inner chambers being located between said pair of lands, first passage means communicating one of said port means to said exhaust port, second passage means communicating the other of said port means to said feed port, third passage means for communicating said flow-through port with the other of said inner chambers, control port means located between said lands and in communication with said one inner chamber, said lands being so constructed with relation to said port means that: when said other valve member is in normal position relative to said port means, said one land will communicate said feed port to said flow-through port via said other inner chamber and cut-off communication of said one inner chamber and said control port means from said feed port and the other of said lands will communicate said control port means to said exhaust port via said one inner chamber; when said other valve member is in a transistory position, relative to said port means, said lands will cut-off communication of said one inner chamber and said control port means from said feed and exhaust ports while said one land communicates said flow-through port via said other inner chamber with said feed port; in one operating position relative to each other said other land will cut-off said one inner chamber and said control port means from said exhaust port and*

*said one land will communicate restricted flow from said feed port to said control port means via said one inner chamber and communicate unrestricted flow from said feed port to said flow-through port via said other inner chamber when the pressure at said flow-through port is greater than that required at said control port means; in a second operating position relative to each other, said other land will cut-off said one inner chamber and said control port means from said exhaust port and said one land will communicate unrestricted flow from said feed port to said control port means via said one inner chamber and communicate restricted flow to said flow through port from said feed port via said other inner chamber when the pressure required by said control port means is greater than that at said flow-through port; and in a third operating position relative to each other, which is the same as said transistory position, pressure is maintained at said control port means; said third operating position occurring only when the pressure at said flow-through port is greater than the pressure required at said control port means and when the pressure required at said control port means is reached; and means for effecting relative movement between said members.*

References Cited in the file of this patent or the original patent

UNITED STATES PATENTS

| | | |
|---|---|---|
| 526,930 | Maxon | Oct. 2, 1894 |
| 1,765,069 | Gibson | June 17, 1930 |
| 1,943,061 | Douglas | Jan. 9, 1934 |
| 2,643,674 | Lapsley et al. | June 30, 1953 |
| 2,705,971 | Dorkins | Apr. 12, 1955 |
| 2,798,461 | Gold et al. | July 9, 1957 |